(12) United States Patent
Hirotsune et al.

(10) Patent No.: US 10,783,841 B2
(45) Date of Patent: Sep. 22, 2020

(54) LIQUID CRYSTAL DISPLAY DEVICE AND METHOD FOR DISPLAYING IMAGE OF THE SAME

(71) Applicants: Panasonic Liquid Crystal Display Co., Ltd., Himeji-shi, Hyogo (JP); Pasona Knowledge Partner Inc., Osaka-shi, Osaka (JP)

(72) Inventors: Satoshi Hirotsune, Hyogo (JP); Toshikazu Koudo, Hyogo (JP)

(73) Assignees: Panasonic Liquid Crystal Display Co., Ltd., Hyogo (JP); Pasona Knowledge Partner Inc., Osaka (JP)

( * ) Notice: Subject to any disclaimer, the term of this patent is extended or adjusted under 35 U.S.C. 154(b) by 0 days.

(21) Appl. No.: 16/116,510

(22) Filed: Aug. 29, 2018

(65) Prior Publication Data

US 2019/0066609 A1 Feb. 28, 2019

(30) Foreign Application Priority Data

Aug. 30, 2017 (JP) .................................. 2017-166090

(51) Int. Cl.
*G09G 3/36* (2006.01)
*G06F 3/14* (2006.01)
*G09G 3/20* (2006.01)

(52) U.S. Cl.
CPC ......... *G09G 3/3607* (2013.01); *G06F 3/1446* (2013.01); *G09G 3/2007* (2013.01); *G09G 3/3648* (2013.01); *G09G 2300/023* (2013.01); *G09G 2320/0271* (2013.01); *G09G 2360/16* (2013.01)

(58) Field of Classification Search
CPC .. G09G 3/3607; G09G 3/3648; G09G 3/2007; G09G 2300/023; G09G 2320/0271; G09G 2360/16; G06F 3/1446
See application file for complete search history.

(56) References Cited

U.S. PATENT DOCUMENTS

2005/0068552 A1* 3/2005 Kimura .................. H04N 1/401
358/1.9
2008/0129668 A1* 6/2008 Ham .................... G09G 3/3648
345/87

(Continued)

FOREIGN PATENT DOCUMENTS

JP 2008-191269 8/2008

*Primary Examiner* — Grant Sitta
(74) *Attorney, Agent, or Firm* — Hamre, Schumann, Mueller & Larson, P.C.

(57) ABSTRACT

A liquid crystal display device comprises a first and second display panels that display a first image and a second image, respectively based on input image data of m bits, and are both driven by n bits, where n<m, a first gradation decision unit that decides an output gradation of n bits for the first display panel based on a first gradation characteristic, the output gradation of n bits for the first display panel and a second gradation decision unit that decides an output gradation of n bits based on a second gradation characteristic for the second display panel, the output gradation of n bits for the second display panel. At least one of the first and second gradation characteristics includes a gradation inverting portion, where the output gradation decreases when the input gradation rises.

10 Claims, 19 Drawing Sheets

(56) References Cited

U.S. PATENT DOCUMENTS

| | | | |
|---|---|---|---|
| 2010/0002018 A1* | 1/2010 | Hirata | G09G 5/028 |
| | | | 345/690 |
| 2015/0235589 A1* | 8/2015 | Cho | G09G 3/3208 |
| | | | 345/207 |
| 2015/0302806 A1* | 10/2015 | Tada | G09G 3/36 |
| | | | 345/88 |
| 2015/0356914 A1* | 12/2015 | Aoyama | G09G 3/3208 |
| | | | 345/690 |
| 2017/0032744 A1* | 2/2017 | Yoo | G02F 1/133512 |
| 2017/0103715 A1* | 4/2017 | Oyama | G02F 1/133504 |
| 2017/0336676 A1* | 11/2017 | Harada | G09G 3/2022 |
| 2019/0258101 A1* | 8/2019 | Yasui | G02F 1/13363 |

* cited by examiner

LIQUID CRYSTAL DISPLAY DEVICE AND METHOD FOR DISPLAYING IMAGE OF THE SAME

CROSS-REFERENCE TO RELATED APPLICATION

The present application claims priority from Japanese application JP 2017-166090 filed on Aug. 30, 2017, the content of which is hereby incorporated by reference into this application.

TECHNICAL FIELD

The present invention relates to a liquid crystal display device and a method of driving the liquid crystal display device.

BACKGROUND

Conventionally, as a technique for improving contrast of an image displayed in a liquid crystal display device, two display panels included in the liquid crystal display device are superimposed, and an image is displayed on each of the two display panels, based on input image data (for example, see Unexamined Japanese Patent Publication No. 2008-191269). Specifically, for example, a color image is displayed on a front (i.e., observer-side) display panel of the two display panels placed on a rear (i.e., backlight-side) display panel displaying a monochrome image, so that the contrast is improved.

However, in the conventional liquid crystal display device, even if a number of bits of the input image data is larger than a number of driving bits in each of the display panels, it is difficult to display an image beyond the number of driving bits of each display panel, which may cause a problem, because it is necessary to display an image with the number of bits of the input image data, which may be made equal to the number of driving bits in each display panel.

The present invention has been made in view of the circumstance described above, and an object of the invention is to provide a liquid crystal display device including a plurality of display panels superimposed, the liquid crystal display device being capable of increasing the number of bits of displayable gradations and improving an accuracy of gradation representation.

SUMMARY

The liquid crystal display device and the image display method according to the present invention each enables a liquid crystal display device including a plurality of display panels superimposed, the liquid crystal display device being capable of increasing the number of bits of displayable gradations and improving the accuracy of gradation representation.

In one general aspect, the instant application describes a liquid crystal display device in which a plurality of display panels are superimposed on each other, an image being displayed on each of the plurality of display panels. The liquid crystal display device comprising a first display panel from the plurality of liquid crystal display panels that displays a first image based on input image data of m bits, the first display panel being driven by n bits, where n<m, a second display panel from the plurality of liquid crystal display that displays a second image based on the input image data of m bits, the second display panel being driven by the n bits, a first gradation decision unit that decides an output gradation of n bits for the first display panel based on a first gradation characteristic for the first display panel, the output gradation of n bits for the first display panel corresponding to input gradation of the input image data of m bits, and a second gradation decision unit that decides an output gradation of n bits for the second display panel based on a second gradation characteristic for the second display panel, the output gradation of n bits for the second display panel corresponding to the input gradation of the input image data of m bits. At least one of the first gradation characteristic and the second gradation characteristic includes a gradation inverting portion, which is a portion where the output gradation decreases when the input gradation rises.

The above general aspect may include one or more of the following features. A decreasing amount of the output gradation in the gradation inverting portion of a first gradation region may be larger than a decreasing amount of the output gradation in the gradation inverting portion of a second gradation region. Gradation in the second gradation region is lower than gradation in the first gradation region.

A decreasing ratio within a predetermined range included in the first gradation region may be larger than a decreasing ratio within the predetermined range included in the second gradation region. Gradation in the second gradation region is lower than gradation in the first gradation region.

The second gradation characteristic may include the gradation inverting portion, and the output gradation of the second gradation characteristic may increase as a whole while repeating an increase and a decrease, when the input gradation of the second gradation characteristic rises.

The first display panel may display the first image based on first gradation that is output gradation decided by the first gradation decision unit. The second display panel may display the second image based on second gradation that is output gradation decided by the second gradation decision unit.

In another general aspect, a liquid crystal display device of the instant application includes a plurality of display panels are superimposed on each other, image being displayed on each of the plurality of display panels. The liquid crystal display device comprising, a first display panel from the plurality of display panels, the first display panel displaying a first image based on input image data of m bits, the first display panel being driven by n bits, where n<m, a second display panel from the plurality of display panels, the second display panel displaying a second image based on the input image data of m bits, the second display panel being driven by the n bits; and an image processor that decides first output gradation of n bits for the first display panel and second output gradation of n bits for the second display panel based on the input image data of m bits. The image processor includes: a first gradation decision unit; a second gradation decision unit; a first correction unit; and a second correction unit. The second gradation decision unit decides second gradation of n bits based on the input image data of m bits, the first gradation decision unit decides first gradation of n bits based on the input image data of m bits and the second gradation, the first gradation having a gradation characteristic including a gradation inverting portion that is a portion where output gradation decreases when input gradation rises. The first correction unit corrects the first gradation to first correction gradation of n bits based on the input image data of m bits and the first gradation, the second correction unit corrects the second gradation to second correction gradation of n bits based on the input image data of m bits and the second gradation, the second correction gradation of n bits having the gradation characteristic including the gradation inverting portion. The image processor decides the first correction gradation as the first output gradation, and decides the second correction gradation as the second output gradation.

The above general aspect may include one or more of the following features. A decreasing amount of the second output gradation in the gradation inverting portion in a first gradation region may be smaller than a decreasing amount of the second output gradation in the gradation inverting portion in the second gradation region. Gradation in the second gradation region is lower than gradation in the first gradation region.

In another general aspect, a method for displaying an image of a liquid crystal display device in which a first display panel and a second display panel are superimposed on each other. The first display panel is driven by n bits displaying a first image based on input image data of m bits, where n<m. The second display panel is driven by the n bits displaying a second image based on the input image data of m bits. The method comprises a first step of measuring transmittance for each gradation corresponding to the n bits in each of the first display panel and the second display panel, a second step of setting a first gradation characteristic, in which output gradation regularly increases in a stepwise manner as input gradation of the input image data rises, based on target transmittance of the first display panel; and a third step of deciding a correction value such that a difference between a first value and the target transmittance in the liquid crystal display device is minimized, the first value being obtained by multiplying first transmittance corresponding to the first gradation characteristic set in the second step by the correction value, and of deciding a second gradation characteristic of the second display panel based on the correction value.

The above general aspect may include one or more of the following features. The method for displaying an image may further comprises a fourth step of deciding the correction value as second transmittance of the second display panel. A characteristic of the second transmittance and a second gradation characteristic corresponding to the characteristic of the second transmittance may include a gradation inverting portion that is a portion where the output gradation decreases when the input gradation rises.

DETAILED DESCRIPTION

Exemplary embodiments of the present invention will be described below with reference to the accompanying drawings. A liquid crystal display device according to the present exemplary embodiment includes: display panels for displaying an image; drive circuits (source driver and gate driver) for driving each of the display panels; timing controllers for controlling each of the drive circuits; an image processor for performing image processing on input image data which is input from the outside and outputting image data to each of the timing controllers; and a backlight for irradiating the display panels with light from the back surface sides of the display panels. A number of display panels is not limited, but may be two or more. The display panels are arranged so as to be superimposed on each other in front-rear direction, when seen from an observer side, and each of display panel displays an image. A liquid crystal display device 10 including two display panels is described as an example as followings.

Figure 1:
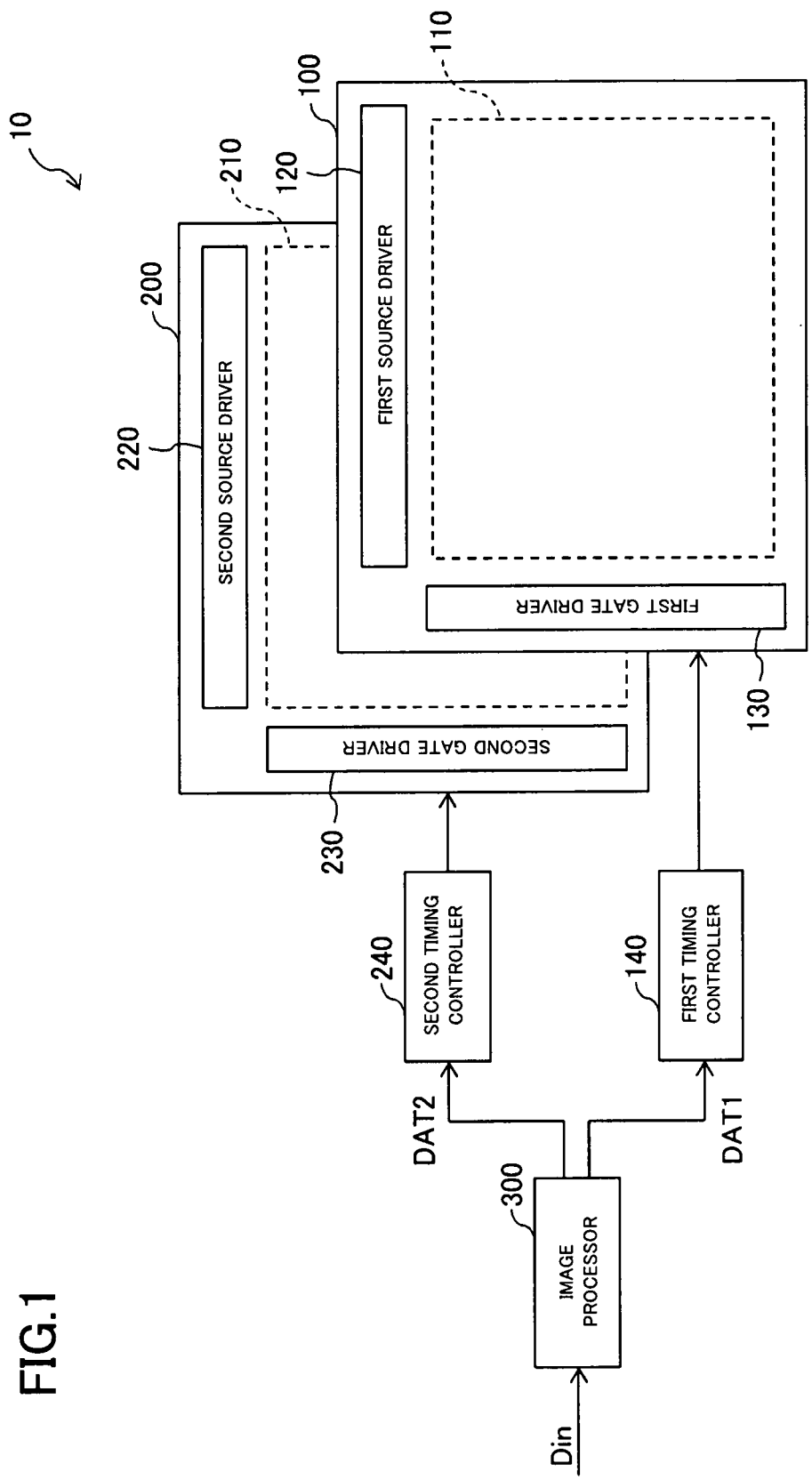
FIG. 1 is a plan view illustrating a schematic configuration of a liquid crystal display device according to a present exemplary embodiment.

FIG. 1 is a plan view illustrating a schematic configuration of liquid crystal display device 10 according to the present exemplary embodiment. As illustrated in FIG. 1, liquid crystal display device 10 includes: display panel 100 disposed at a position closer to an observer (i.e., a front side); display panel 200 disposed at a position farther from the observer than the display panel 100 (i.e., a rear side); first source driver 120 and first gate driver 130 provided in display panel 100; first timing controller 140 controlling first source driver 120 and first gate driver 130; second source driver 220 and second gate driver 230 provided in display panel 200; second timing controller 240 controlling second source driver 220 and second gate driver 230; and image processor 300 outputting image data to first timing controller 140 and second timing controller 240. For example, display panel 100 displays a color image corresponding to input image data on first image display region 110. Display panel 200 displays a monochrome image corresponding to the input image data on second image display region 210. Image processor 300 receives input image data Din sent from an external system (not illustrated), performs image processing, which will be described later, on the input image data Din, outputs first image data DAT1 to first timing controller 140, and outputs second image data DAT2 to second timing controller 240. Image processor 300 also outputs a control signal such as a synchronizing signal (not illustrated in FIG. 1) to first timing controller 140 and second timing controller 240. First image data DAT1 is image data for color image display, and second image data DAT2 is image data for monochrome image display. The backlight (not illustrated in FIG. 1) is disposed on the back surface side of display panel 200. A specific configuration of image processor 300 will be described later.

Figure 2:
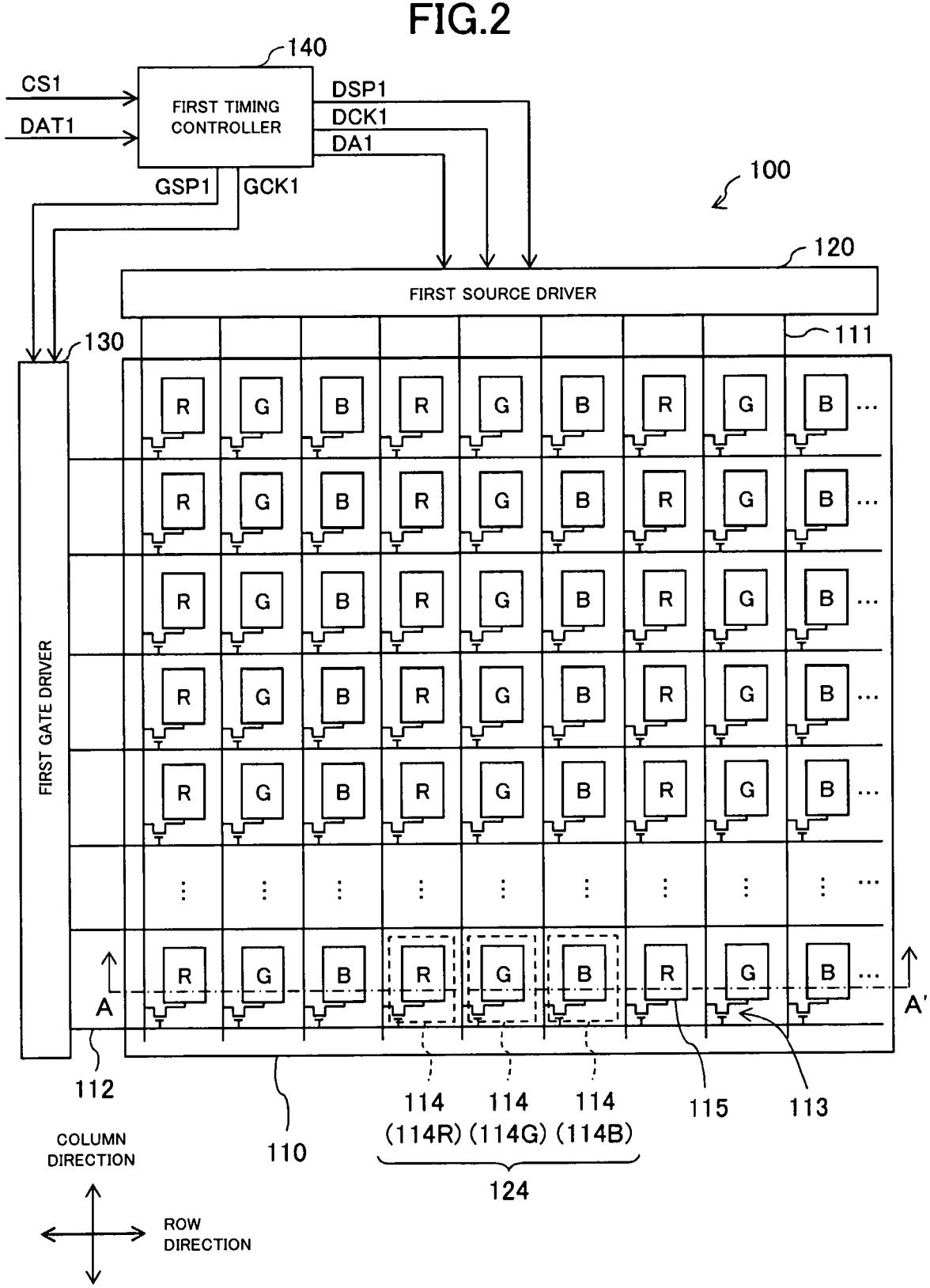
FIG. 2 is a plan view illustrating a schematic configuration of display panel 100.
Figure 3:
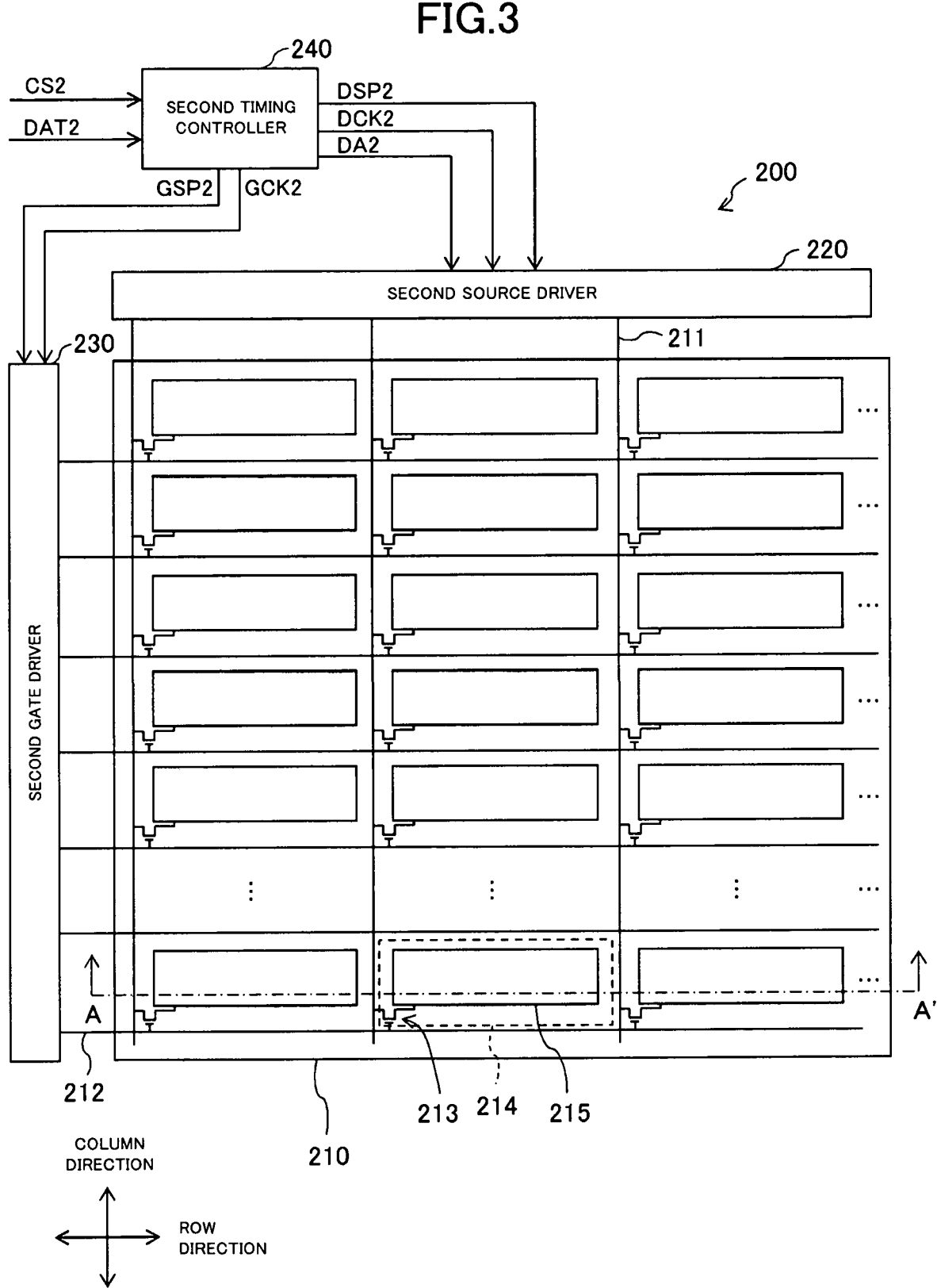
FIG. 3 is a planar view illustrating a schematic configuration of display panel 200.
Figure 4:
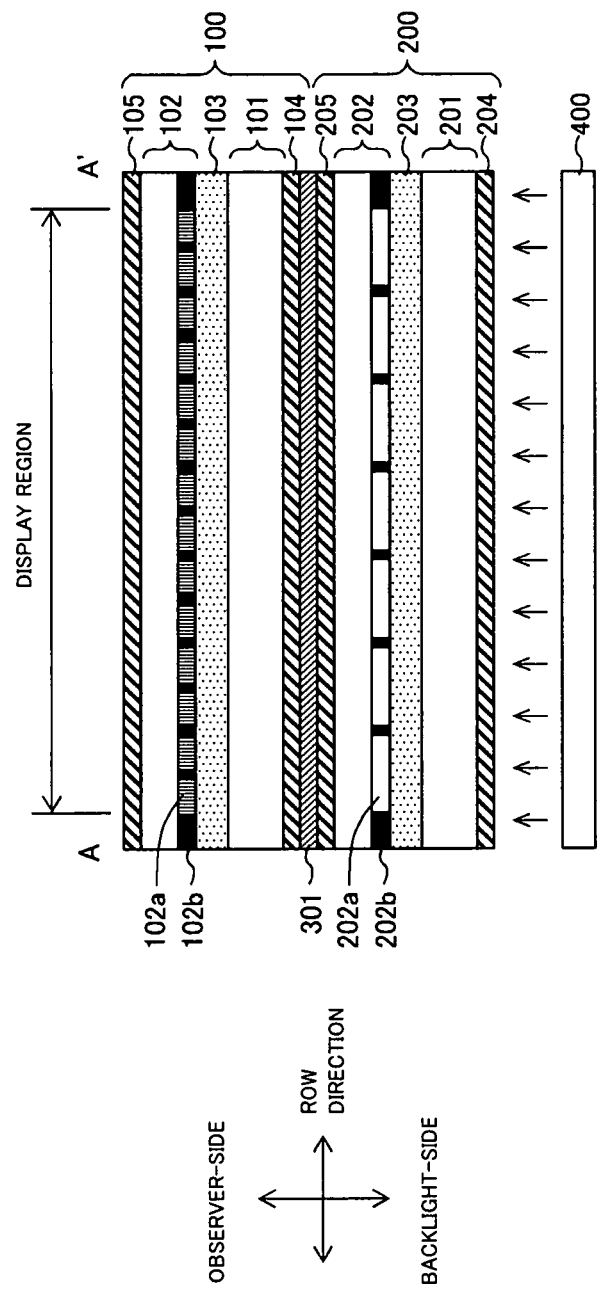
FIG. 4 is a sectional view taken along line A-A' in FIG. 2 and line A-A' in FIG. 3.

FIG. 2 is a plan view illustrating a schematic configuration of display panel 100, and FIG. 3 is a planar view illustrating a schematic configuration of display panel 200. FIG. 4 is a sectional view taken along line A-A' in FIG. 2 and line A-A' in FIG. 3.

Referring to FIGS. 2 and 4, the configuration of display panel 100 will be described. As illustrated in FIG. 4, display panel 100 includes: thin film transistor substrate 101 disposed on the backlight 400 side; counter substrate 102 disposed on the observer side and opposed to thin film transistor substrate 101; and liquid crystal layer 103 disposed between thin film transistor substrate 101 and counter substrate 102. Polarizing plate 104 is disposed on the backlight 400 side of display panel 100, and polarizing plate 105 is disposed on the observer side.

As illustrated in FIG. 2, thin film transistor substrate 101 has, formed thereon, data lines 111 (source lines) extending in a first direction (e.g., a column direction), gate lines 112 extending in a second direction (e.g., a row direction) different from the first direction, and thin film transistors 113 (TFTs) respectively formed in a vicinity of intersections between data lines 111 and gate lines 112. A region surrounded with adjoining two of data lines 111 and adjoining two of gate lines 112 when display panel 100 is seen in plan view is defined as one subpixel 114. Subpixels 114 are arranged in a matrix form (i.e., in the row and column directions). Data lines 111 are arranged at equal intervals in the row direction, and gate lines 112 are arranged at equal intervals in the column direction. Thin film transistor substrate 101 has, formed thereon, pixel electrodes 115 for subpixels 114, and one common electrode (not illustrated) which is common to subpixels 114. Drain electrodes of thin film transistors 113 are electrically connected to data lines 111, the source electrodes are electrically connected to pixel electrodes 115, and the gate electrodes are electrically connected to gate lines 112.

As illustrated in FIG. 4, counter substrate 102 has, formed thereon, color filters 102a (i.e., colored layers) corresponding to subpixels 114. Each color filter 102a is surrounded with black matrix 102b blocking transmission of light, and is formed in, for example, a rectangular shape. Color filters 102a include: red color filters made of a red (R color) material and allowing transmission of red light; green color filters made of a green (G color) material and allowing transmission of green light; and blue color filters made of a blue (B color) material and allowing transmission of blue light. The red color filters, the green color filters, and the blue color filters are repeatedly arrayed in this order in the row direction. That color filters of the same color are arrayed in the column direction. Black matrix 102b is formed in a boundary portion between adjoining two of color filters 102a in the row and column directions. As illustrated in FIG. 2, in correspondence with each of color filters 102a, subpixels 114 include: red subpixels 114R corresponding to the red color filters; green subpixels 114G corresponding to the green color filters; and blue subpixels 114B corresponding to the blue color filters. In display panel 100, one of red subpixels 114R, one of green subpixels 114G, and one of blue subpixels 114B constitute one pixel 124, and the pixels 124 are arranged in a matrix form.

First timing controller 140 has a configuration known in the art. For example, first timing controller 140 generates first image data DA1 as well as various timing signals (data start pulse DSP1, data clock DCK1, gate start pulse GSP1, gate clock GCK1) for controlling the driving of first source driver 120 and first gate driver 130, based on first image data DAT1 and first control signal CS1 (e.g., a clock signal, a vertical synchronizing signal, a horizontal synchronizing signal) output from image processor 300 (see FIG. 2). First timing controller 140 outputs first image data DA1, data start pulse DSP1, and data clock DCK1 to first source driver 120. First timing controller 140 also outputs gate start pulse GSP1 and gate clock GCK1 to first gate driver 130.

First source driver 120 is a driver driven with n bits (n=10). First source driver 120 outputs a data signal (data voltage) corresponding to first image data DA1 to data lines 111, based on data start pulse DSP1 and data clock DCK1. First gate driver 130 is a driver driven with n bits (n=10), and outputs a gate signal (gate voltage) to gate lines 112, based on gate start pulse GSP1 and gate clock GCK1.

Data voltage is supplied from first source driver 120 to each data line 111. Gate voltage is supplied from first gate driver 130 to each gate line 112. Common voltage Vcom is supplied from a common driver (not illustrated) to the common electrode. When gate voltage (gate-on voltage) is supplied to gate lines 112, thin film transistors 113 connected to gate lines 112 are turned on, and the data voltage is supplied to pixel electrodes 115 through data lines 111 connected to thin film transistors 113. An electric field is generated by a difference between the data voltage supplied to pixel electrodes 115 and common voltage Vcom supplied to the common electrode. An image is displayed by driving a liquid crystal using this electric field to control the transmittance of light from backlight 400. In display panel 100, a color image is displayed by supplying a desired data voltage to data lines 111 connected to pixel electrodes 115 of red subpixels 114R, green subpixels 114G, and blue subpixels 114B. Display panel 100 may employ known other configurations.

Next, the configuration of display panel 200 will be described with reference to FIGS. 3 and 4. As illustrated in FIG. 4, display panel 200 includes: thin film transistor substrate 201 disposed on the backlight 400 side; counter substrate 202 disposed on the observer side and opposed to thin film transistor substrate 201; and liquid crystal layer 203 disposed between thin film transistor substrate 201 and counter substrate 202. Polarizing plate 204 is disposed on the backlight 400 side of display panel 200, and polarizing plate 205 is disposed on the observer side. Diffusion plate 301 is disposed between polarizing plate 104 of display panel 100 and polarizing plate 205 of display panel 200.

Figure 5A:
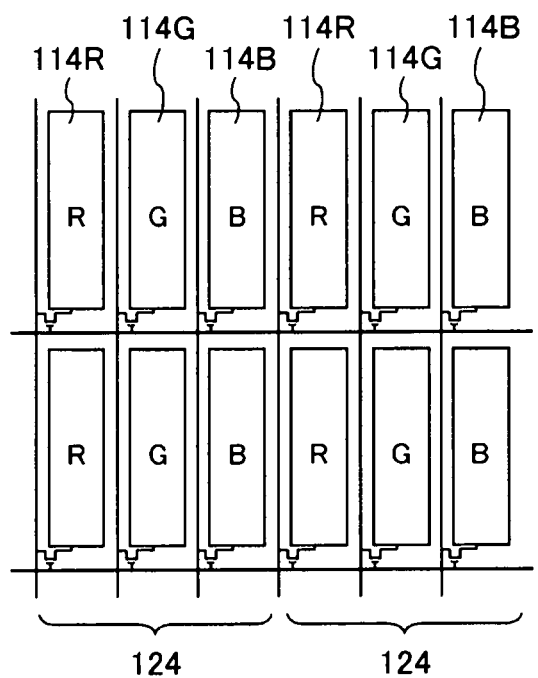
FIGS. 5A and 5B are plan views illustrating examples of schematic configurations of pixels in the liquid crystal display device according to the present exemplary embodiment.
Figure 5B:
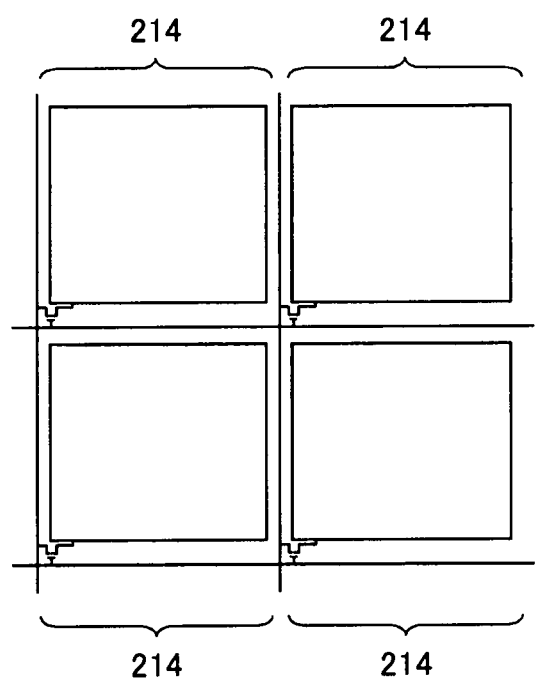

As illustrated in FIG. 3, thin film transistor substrate 201 has, formed thereon, data lines 211 (source lines) extending in the column direction, gate lines 212 extending in the row direction, and thin film transistors 213 respectively formed in vicinity of intersections between data lines 211 and gate lines 212. A region surrounded with adjoining two of data lines 211 and adjoining two of gate lines 212 when display panel 200 is seen in planar view is defined as one pixel 214. Pixels 214 are arranged in a matrix form (i.e., in the row and column directions). Data lines 211 are arranged at equal intervals in the row direction, and gate lines 212 are arranged at equal intervals in the column direction. Thin film transistor substrate 201 has, formed thereon, pixel electrodes 215 for pixels 214, and one common electrode (not illustrated) which is common to pixels 214. Drain electrodes of thin film transistors 213 are electrically connected to data lines 211, source electrodes are electrically connected to pixel electrodes 215, and gate electrodes are electrically connected to gate lines 212. The pixels 124 on display panel 100 and pixels 214 on display panel 200 overlap with each other in plan view. For example, as illustrated in FIG. 5, one pixel 124 (see FIG. 5A) including red subpixel 114R, green subpixel 114G, and blue subpixel 114B overlaps with one pixel 214 (see FIG. 5B) in plan view. Subpixels 114 on display panel 100 and pixels 214 on display panel 200 may be arranged in one-to-one correspondence.

As illustrated in FIG. 4, counter substrate 202 has, formed thereon, black matrix 202b blocking transmission of light, at a position corresponding to a boundary portion of each pixel 214. A color filter is not formed, but an overcoat film is formed on region 202a surrounded with black matrix 202b.

Second timing controller 240 has a configuration known in the art. For example, second timing controller 240 generates second image data DA2 as well as various timing signals (data start pulse DSP2, data clock DCK2, gate start pulse GSP2, gate clock GCK2) for controlling the driving of second source driver 220 and second gate driver 230, based on second image data DAT2 and second control signal CS2 (e.g., a clock signal, a vertical synchronizing signal, a horizontal synchronizing signal) output from image processor 300 (see FIG. 3). Second timing controller 240 outputs second image data DA2, data start pulse DSP2, and data clock DCK2 to second source driver 220. Second timing controller 240 also outputs gate start pulse GSP2 and gate clock GCK2 to second gate driver 230.

Second source driver 220 is a driver driven with n bits (n=10), and outputs a data voltage corresponding to second image data DA2 to data lines 211, based on data start pulse DSP2 and data clock DCK2. Second gate driver 230 is a driver driven with n bits (n=10), and outputs a gate voltage to gate lines 212, based on gate start pulse GSP2 and gate clock GCK2.

Data voltage is supplied from second source driver 220 to each data line 211. Gate voltage is supplied from second gate driver 230 to each gate line 212. Common voltage Vcom is supplied from a common driver to the common electrode. When the gate voltage (gate-on voltage) is supplied to gate lines 212, thin film transistors 213 connected to gate lines 212 are turned on, and the data voltage is supplied to pixel electrodes 215 through data lines 211 connected to thin film transistors 213. An electric field is generated by a difference between the data voltage supplied to pixel electrodes 215 and common voltage Vcom supplied to the common electrode. An image is displayed by driving a liquid crystal using this electric field to control the transmittance of light from backlight 400. A monochrome image is displayed on display panel 200. Display panel 200 may employ known other configurations.

Figure 6:
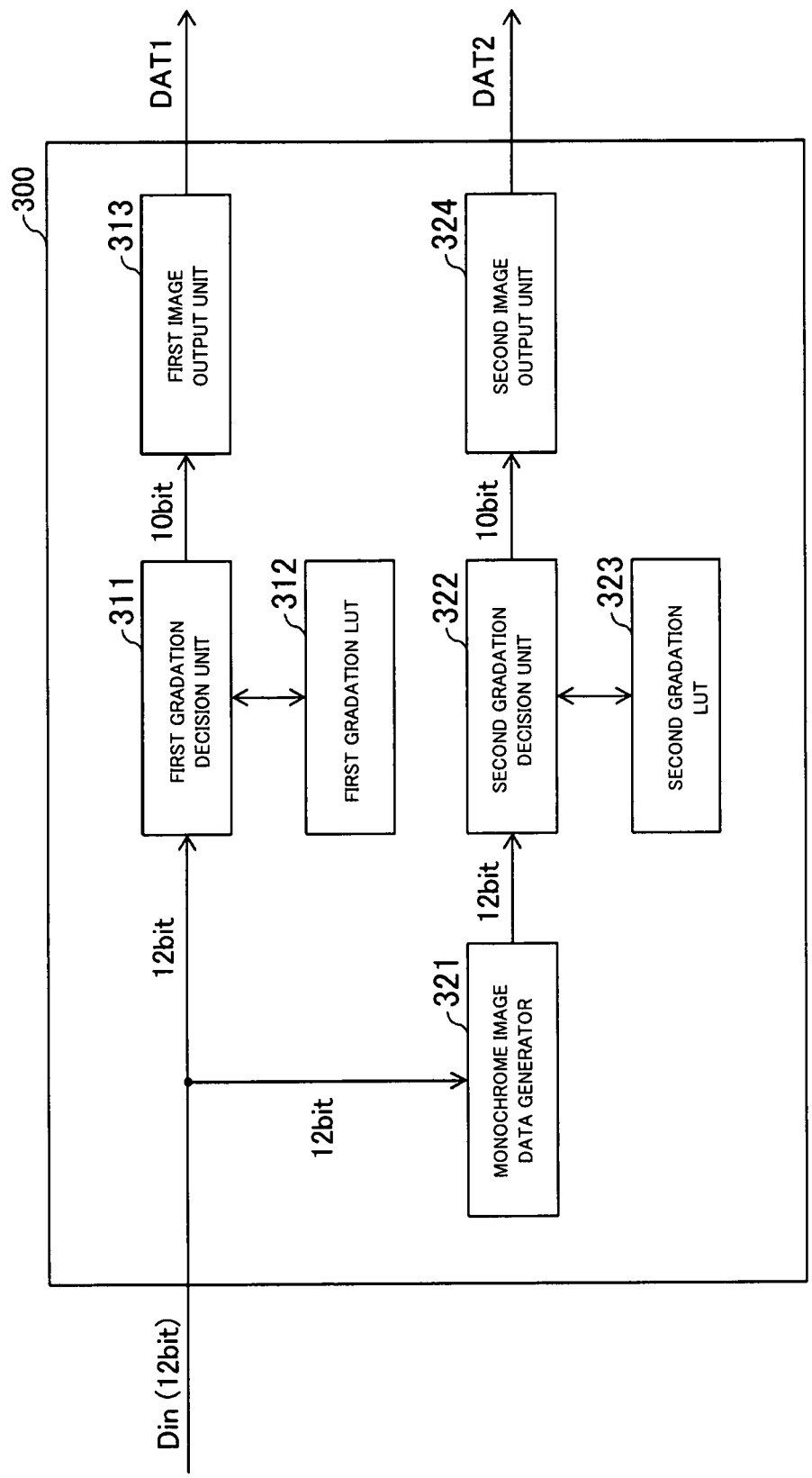
FIG. 6 is a block diagram illustrating a configuration of image processor 300 according to the present exemplary embodiment.

FIG. 6 is a block diagram illustrating a configuration of image processor 300. Image processor 300 includes first gradation decision unit 311, first gradation look-up table (LUT) 312, first image output part 313, monochrome image data generation part 321, second gradation decision unit 322, second gradation LUT 323, and second image output part 324. Here, each of display panel 100 and display panel 200 is a display panel whose gamma value ($\gamma$) has a characteristic of 2.2, and displays an image based on image data of n bits (n=10).

Figure 7:
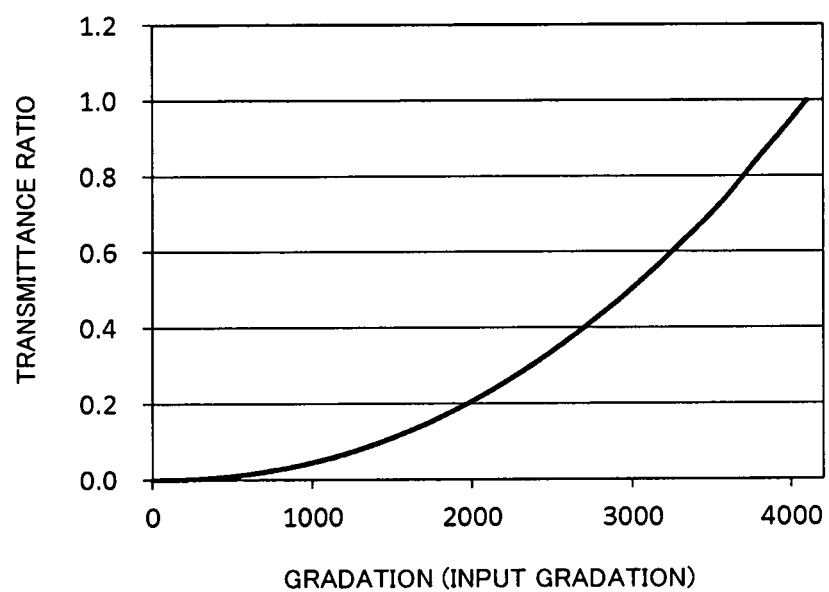
FIG. 7 is a graph of transmittance characteristics (luminance characteristics) when the combined gamma value is 2.2.

Image processor 300 performs image processing (to be described later), based on input image data Din of m bits (where m>n and m=12). For example, image processor 300 generates first image data DAT1 of a 10-bit color images for display panel 100, and second image data DAT2 of a 10-bit monochrome image for display panel 200. Moreover, image processor 300 determines a gradation (first gradation) of first image data DAT1 and a gradation (second gradation) of second image data DAT2 so that combined gamma value of a display image (combined gradation) obtained by combining the color image with the monochrome image is able to satisfy a target value ($\gamma$=2.2). FIG. 7 is a graph of transmittance characteristics (luminance characteristics) when the combined gamma value is 2.2.

Specifically, image processor 300 receives 12-bit input image data Din transmitted from an external system, and then transfers input image data Din to first gradation decision unit 311 and monochrome image data generation part 321. Input image data Din includes, for example, luminance information (gradation information) and color information. Color information is information for specifying a color. In cases of 12-bit input image data Din, each of multiple colors including R color, G color, and B color can be expressed by a value of 0 to 4095. The multiple colors include at least the R color, the G color, and the B color, and may further include W (white) color and/or Y (yellow) color. In cases where the multiple colors are the R color, the G color, and the B color, the color information of input image data Din is expressed by "RGB values" ([R value, G value, B value]). For example, in a case where a color corresponding to input image data Din is "white", the "RGB values" are expressed by [4095, 4095, 4095]. In a case where a color corresponding to input image data Din is "red", the "RGB values" are expressed by [4095, 0, 0]. In a case where a color corresponding to input image data Din is "black", the "RGB values" are expressed by [0, 0, 0].

Figure 8:
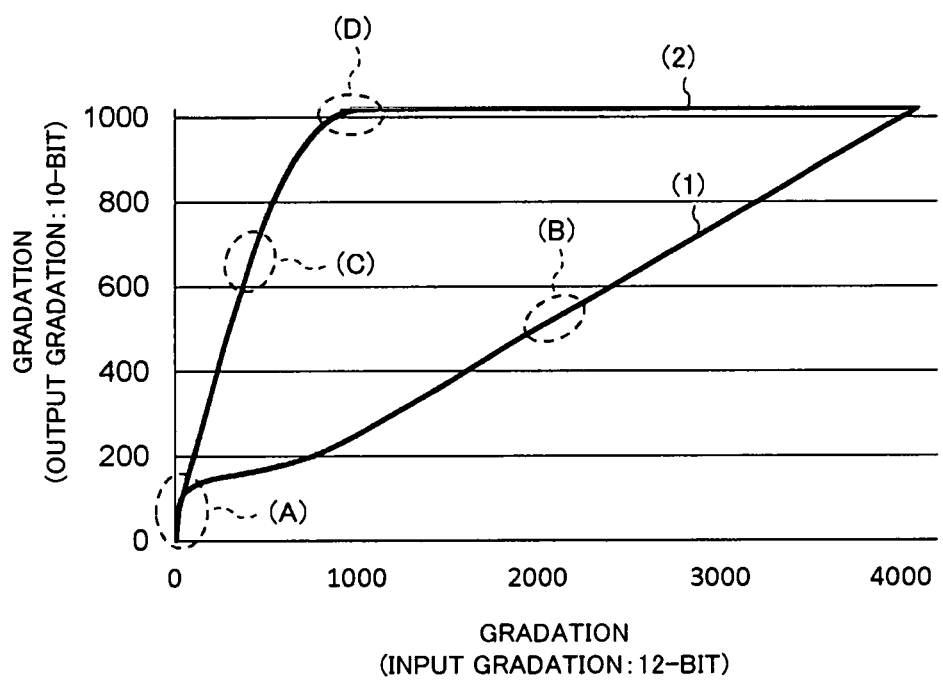
FIG. 8 is a graph showing a first gradation characteristic and a second gradation characteristic according to the present exemplary embodiment.

First gradation decision unit 311 acquires 12-bit input image data Din from the external system, and then refers to first gradation LUT 312 to determine a gradation (first gradation) corresponding to 10-bit color image data (first gradation determination process). In first gradation LUT 312, based on a first gradation characteristic for display panel 100, a 10-bit output gradation is associated with a 12-bit input gradation. Curve (1) illustrated in FIG. 8 shows the first gradation characteristic. First gradation decision unit 311 determines a 10-bit output gradation corresponding to the 12-bit input image data Din (input gradation), based on the first gradation characteristic, and outputs 10-bit color image data corresponding to the determined output gradation to first image output part 313.

Monochrome image data generation part 321 acquires the 12-bit input image data Din, and then generates monochrome image data corresponding to a monochrome image, using the maximum value (R value, G value, or B value) of the values (here, RGB values: [R value, G value, B value]) of each color indicating the color information of input image data Din. Specifically, with regard to RGB values corresponding to a target one of pixels 214 (see FIG. 3), monochrome image data generation part 321 generates the monochrome image data by setting the maximum value of the RGB values at a value of target pixel 214. Monochrome image data generation part 321 outputs the 12-bit monochrome image data generated to second gradation decision unit 322.

Second gradation decision unit 322 acquires 12-bit monochrome image data generated by monochrome image data generation part 321, and then refers to second gradation LUT 323 to determine a gradation (second gradation) corresponding to 10-bit monochrome image data (second gradation determination process). In second gradation LUT 323, based on a second gradation characteristic for display panel 200, a 10-bit output gradation is associated with the 12-bit input gradation. Curve (2) illustrated in FIG. 8 shows the second gradation characteristic. Second gradation decision unit 322 determines a 10-bit output gradation (second gradation) corresponding to the 12-bit monochrome image data (input gradation), based on the second gradation characteristic, and outputs 10-bit monochrome image data corresponding to the determined output gradation to second image output part 324.

First image output part 313 outputs the 10-bit color image data (first gradation) as first image data DAT1 to first timing controller 140. Second image output part 324 outputs the 10-bit monochrome image data (second gradation) as second image data DAT2 to second timing controller 240. Image processor 300 outputs first control signal CS1 to first timing controller 140 and outputs second control signal CS2 to second timing controller 240 (FIG. 2 and FIG. 3). Image processor 300 may perform various filtering processes such as an expansion filtering process and an average value filtering process, in addition to the above processes.

Figure 9:
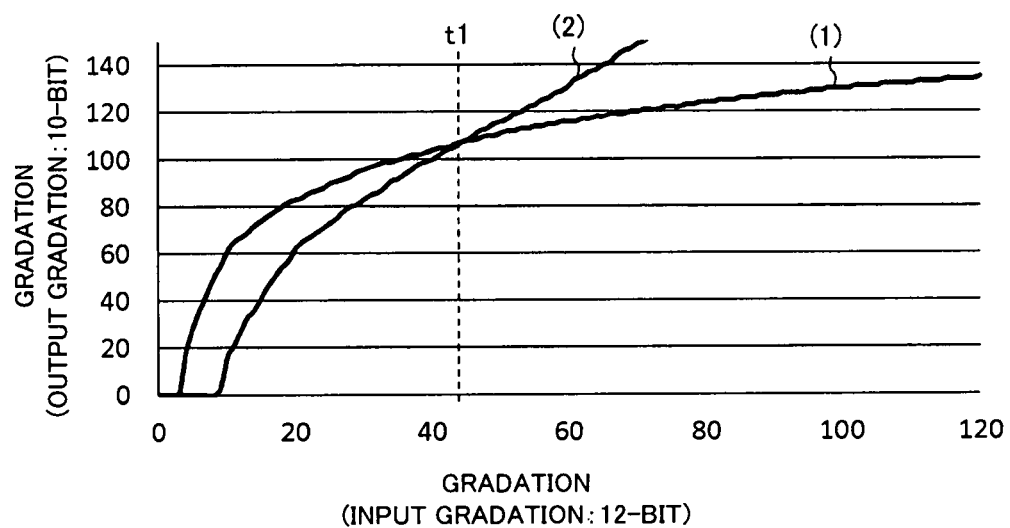
FIG. 9 is a graph corresponding to enlarged portion (A) in FIG. 8.

Next, details of the first gradation characteristic and second gradation characteristic will be described. FIG. 9 is a graph corresponding to enlarged portion (A) in FIG. 8. Each of the first gradation characteristic (curve (1)) and the second gradation characteristic (curve (2)) changes such that the output gradation monotonically increases as the input gradation rises, in a low gradation region. The first gradation characteristic and the second gradation characteristic change so as to cross each other at a predetermined input gradation (t1 gradation). Attention is paid to the first gradation characteristic. The input gradation sharply rises in a region from 0 gradation to substantially about 20 gradation, and moderately rises in a region of the about 20 gradation or more.

Figure 10:
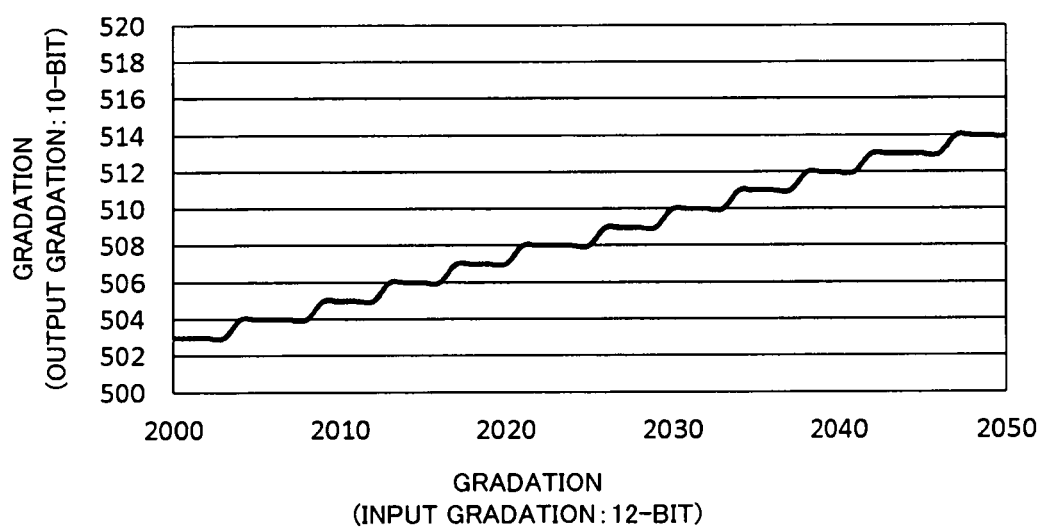
FIG. 10 shows the first gradation characteristic (curve (1)) corresponding to enlarged portion (B) in FIG. 8.

FIG. 10 shows the first gradation characteristic (curve (1)) corresponding to enlarged portion (B) in FIG. 8. With regard to the first gradation characteristic, the output gradation regularly rises in a stepwise manner as the input gradation rises, in a region which includes portion (B) and where the input gradation moderately rises. For example, with regard to the first gradation characteristic, when the input gradation rises by four gradations, the output gradation regularly changes in a stepwise manner so as to rise by one gradation. The first gradation characteristic does not include a portion (gradation inversion portion) where the output gradation decreases (is inverted) when the input gradation rises.

Figure 11:
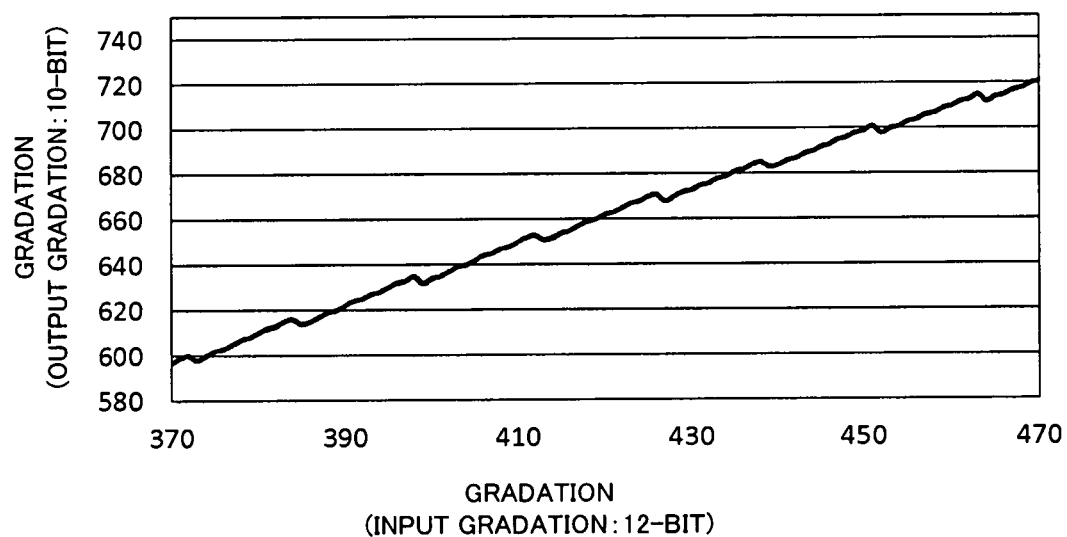
FIG. 11 shows the second gradation characteristic (curve (2)) corresponding to enlarged portion (C) in FIG. 8.

FIG. 11 shows the second gradation characteristic (curve (2)) corresponding to enlarged portion (C) in FIG. 8. Portion (C) shows a part of a rising region (e.g., a region from 0 gradation to about 900 gradation) in the low gradation region. In this region, the output gradation rises as a whole while increasing and decreasing periodically and repeatedly as the input gradation rises. That is, the second gradation characteristic increases as a whole while including a portion (gradation inversion portion) where the output gradation decreases (is inverted) when the input gradation rises. In the gradation inversion portion, for example, the output gradation is m1 gradation when the input gradation is n1 gradation, the output gradation is m2 gradation (m2<m1) when the input gradation is n2 gradation (n1<n2), and the output gradation is m3 gradation (m2<m1<m3) when the input gradation is n3 gradation (n1<n2<n3).

Figure 12:
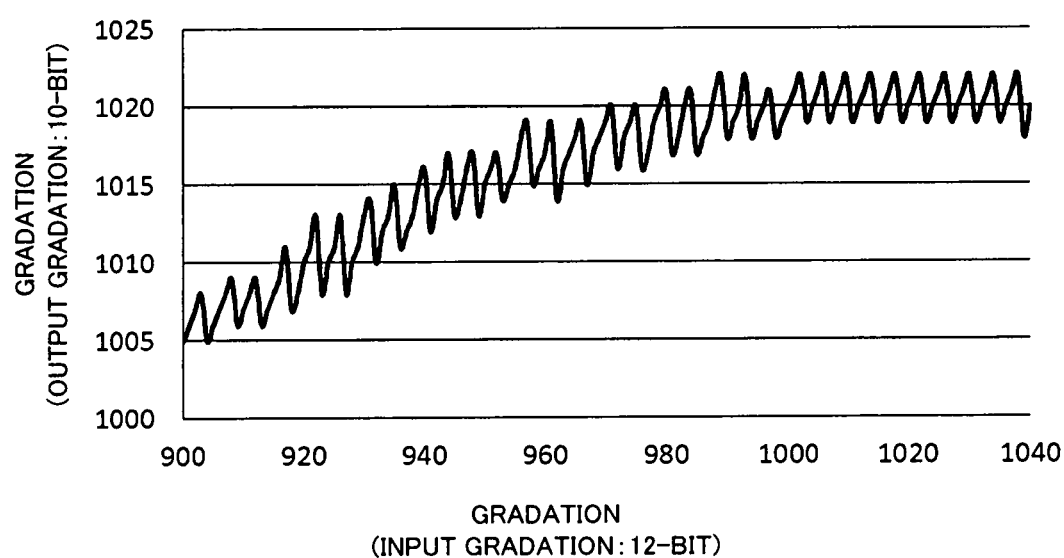
FIG. 12 shows the second gradation characteristic (curve (2)) corresponding to enlarged portion (D) in FIG. 8.

FIG. 12 shows the second gradation characteristic (curve (2)) corresponding to enlarged portion (D) in FIG. 8. Portion (D) shows a part of a region (e.g., a region of about 900 gradation or more) after the rising region. In this region, as the same as the rising region (see FIG. 11), the output gradation changes while increasing and decreasing periodically and repeatedly as the input gradation rises. In this region, the amount of change (decreasing amount and increasing amount) in the gradation inversion portion is larger than the amount of change (decreasing amount and increasing amount) in the gradation inversion portion belonging to the rising region (see FIG. 11). For example, in the gradation inversion portion in the region after the rising region, the output gradation is m4 gradation when the input gradation is n4 gradation, the output gradation is m5 gradation (m5<m4) when the input gradation is n5 gradation (n4<n5), and the output gradation is m6 gradation (m5<m4<m6) when the input gradation is n6 gradation (n4<n5<n6). In this case, relations of, (m4−m5)>(m1−m2) and (m6−m5)>(m3−m2) are satisfied. In the region, a ratio of the gradation inversion portion in a predetermined range is larger than a ratio of the gradation inversion portion in the predetermined range included in the rising region (see FIG. 11). More specifically, the number of gradation inversion portions included in the predetermined range from P1 gradation to P2 gradation of the region is greater than the number of gradation inversion portions included in the predetermined range from P3 gradation to P4 gradation of the rising region (see FIG. 11) (P3<P4<P1<P2, (P2−P1)= (P4−P3)).

Figure 13:
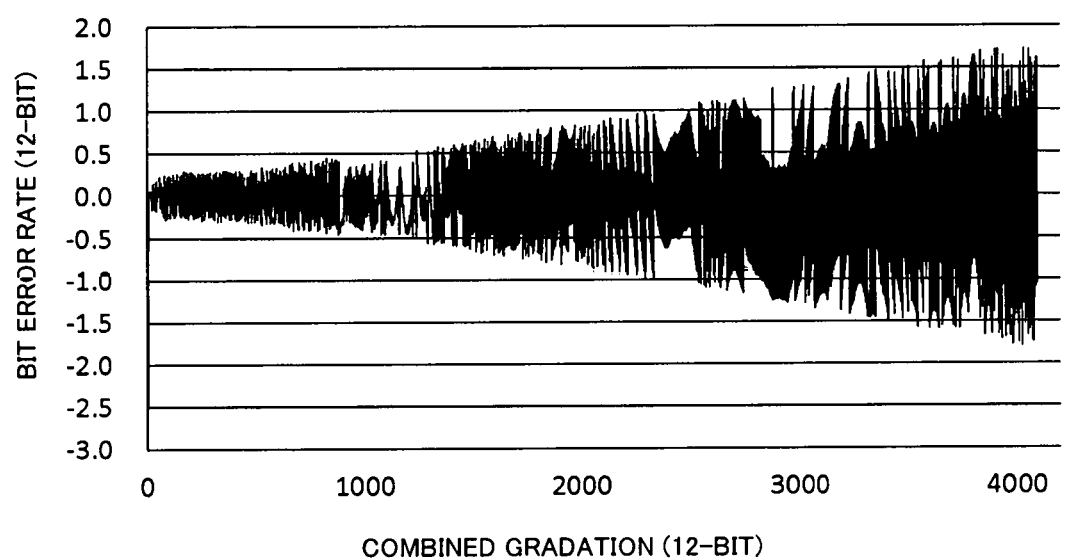
FIG. 13 is a graph showing an error (bit error rate) between a combined transmittance and a target transmittance according to the present exemplary embodiment.

FIG. 13 is a graph showing an error (bit error rate) between a transmittance (combined transmittance (combined luminance) of the combined image in a case where display panel 100 and display panel 200 display images with the first gradation and the second gradation determined based on the first gradation characteristic and the second gradation characteristic, and a target transmittance (target luminance) in a case where the combined gamma value is 2.2. The bit error rate is calculated from, for example, the following equation.

Bit error rate [bit]={(target transmittance corresponding to $n$ gradation)−(combined transmittance corresponding to $n$ gradation)}/{(target transmittance corresponding to ($n$+1) gradation)− (target transmittance corresponding to $n$ gradation)}

As illustrated in FIG. 13, in a region of substantially 1000 gradation or less, the bit error rate is within ±0.5 bits, and the gradation performance of 12 bits is obtained. In a region of about 1000 gradation or more, the bit error rate is within ±2.0 bits, and the gradation performance of 10 bits is obtained. As described above, liquid crystal display device 10 according to the present exemplary embodiment improves, to the gradation performance of 10 bits or more, the gradation performance corresponding to the number of drive bits of display panel 100 and display panel 200 (in the above example, 10 bits), and therefore increases the number of displayable gradations. Moreover, liquid crystal display device 10 makes the combined transmittance close to the target transmittance. Therefore, liquid crystal display device 10 smoothes the change in gradation (combined gradation) of the display image (combined image) and improves the accuracy of gradation representation. In display panel 200, there is a possibility that a level difference is visually recognized when a display image is seen from an oblique direction since the second gradation characteristic has the gradation inversion portion (see FIGS. 11 and 12). However, liquid crystal display device 10 includes diffusion plate 301 (see FIG. 4) between display panel 200 and display panel 100, and therefore reduces the level difference.

Next, a setting method for the first gradation characteristic and the second gradation characteristic will be described. The first gradation characteristic and the second gradation characteristic are set by, for example, a procedure described below.

Figure 14:
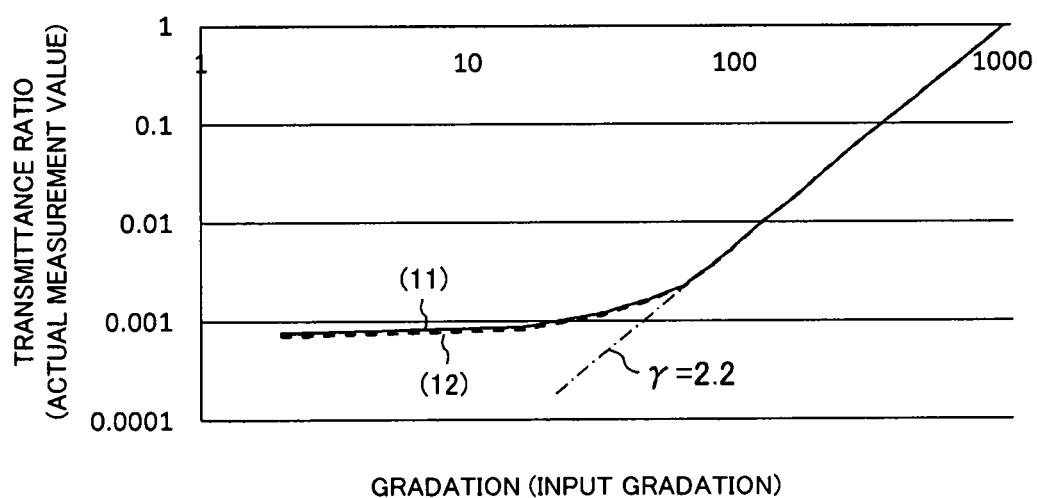
FIG. 14 shows a transmittance measured for each display panel according to the present exemplary embodiment.

First, a transmittance for the input gradation is measured (actually measured) in each of display panel 100 and display panel 200 (measurement step). Specifically, image data in gradations from 0 gradation to 1023 gradation corresponding to 10 bits is input to each of display panel 100 and display panel 200, and a transmittance for each gradation (input gradation) is measured. Curve (11) in FIG. 14 shows the transmittance (first measured value) measured for display panel 100, and curve (12) in FIG. 14 shows the transmittance (second measured value) measured for display panel 200. In FIG. 14, curves (11) and (12) are each represented by a log-log plot, and a straight line portion including a one dot chain line shows transmittance (ideal value) corresponding to a gamma value 2.2.

Next, a first gradation characteristic of display panel 100 is set (first gradation characteristic setting step). For example, based on the target transmittance (target luminance) of display panel 100, a 10-bit desired gradation (0 gradation to 1023 gradation) (output gradation) is allocated to each 12-bit gradation (0 gradation to 4095 gradation) (input gradation). An output gradation (first gradation) is set to regularly increase in a stepwise manner as an input gradation rises. Curve (1) in FIG. 8 shows the first gradation characteristic set as described above.

Figure 15:
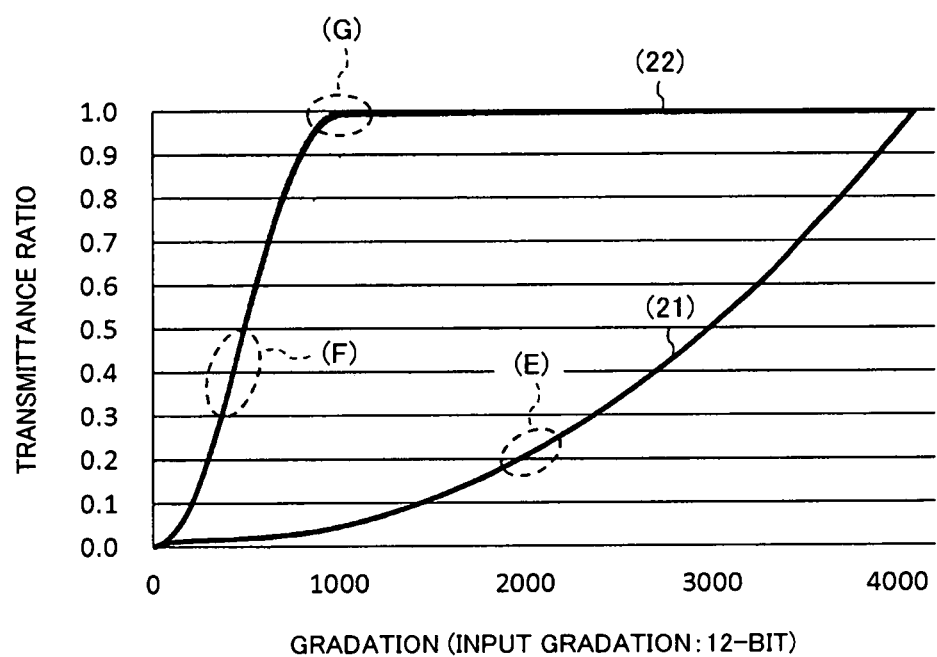
FIG. 15 shows a first transmittance characteristic and a second transmittance characteristic according to the present exemplary embodiment.
Figure 16:
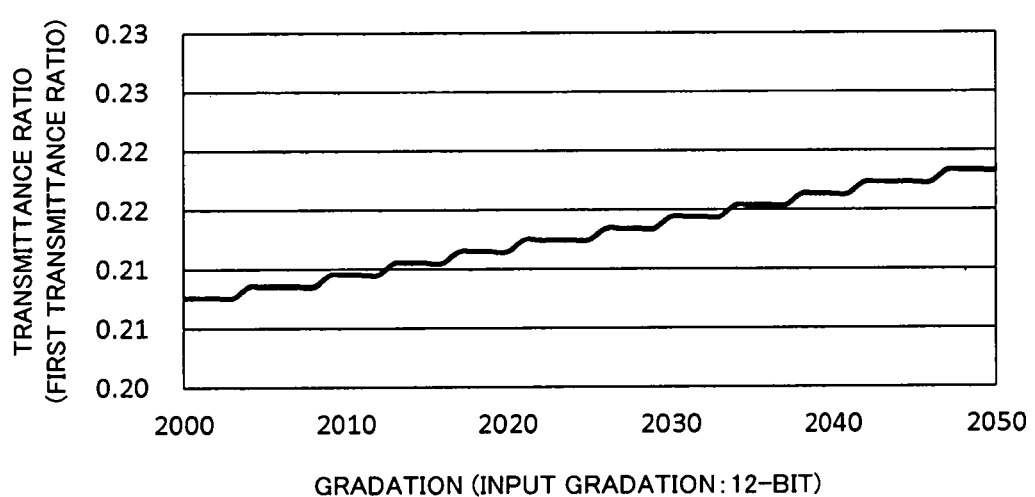
FIG. 16 is a graph corresponding to enlarged portion (E) in FIG. 15.

Next, in the first measured value (curve (11) in FIG. 14), transmittance corresponding to each of the gradations (0 gradation to 1023 gradation) thus allocated is acquired. The measured transmittance is thus associated with each 12-bit input gradation (0 gradation to 4095 gradation). Curve (21) in FIG. 15 shows a characteristic of transmittance (first transmittance) with respect to the 12-bit input gradation (first transmittance characteristic) in display panel 100. FIG. 16 is a graph corresponding to enlarged portion (E) in FIG. 15. As illustrated in FIG. 16, the transmittance of display panel 100 regularly increases in a stepwise manner as the input gradation rises, as in the first gradation characteristic (see FIG. 10).

Next, the second gradation characteristic of display panel 200 is set as followings. It is assumed herein that the combined gamma value is 2.2. In this case, the target transmittance in liquid crystal display device 10 (i.e., combined target transmittance of display panel 100 and display panel 200) is calculated from the following equation. The input gradation ranges from 0 gradation to 4095 gradation.

Target transmittance=(input gradation/4095)^2.2

Figure 17:
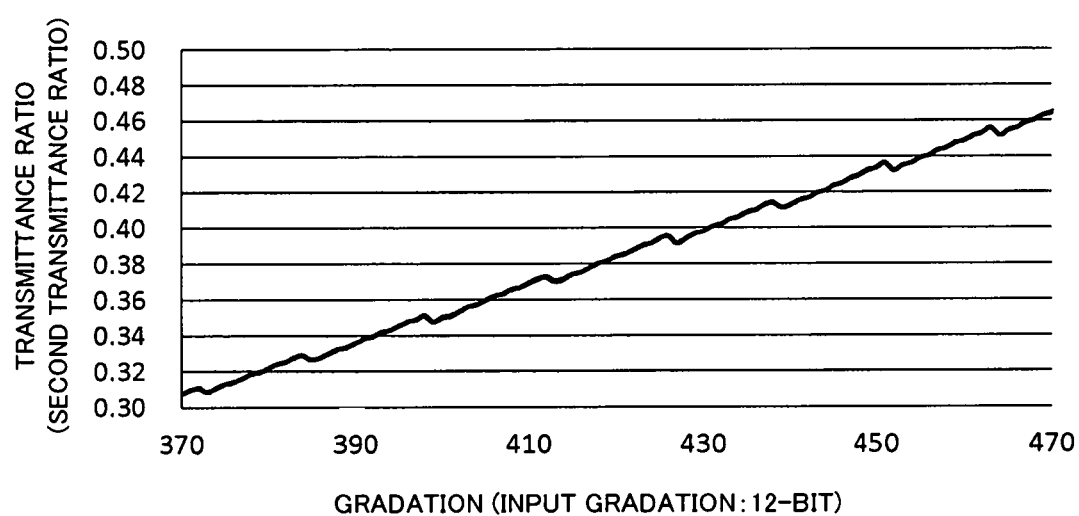
FIG. 17 is a graph corresponding to enlarged portion (F) in FIG. 15.
Figure 18:
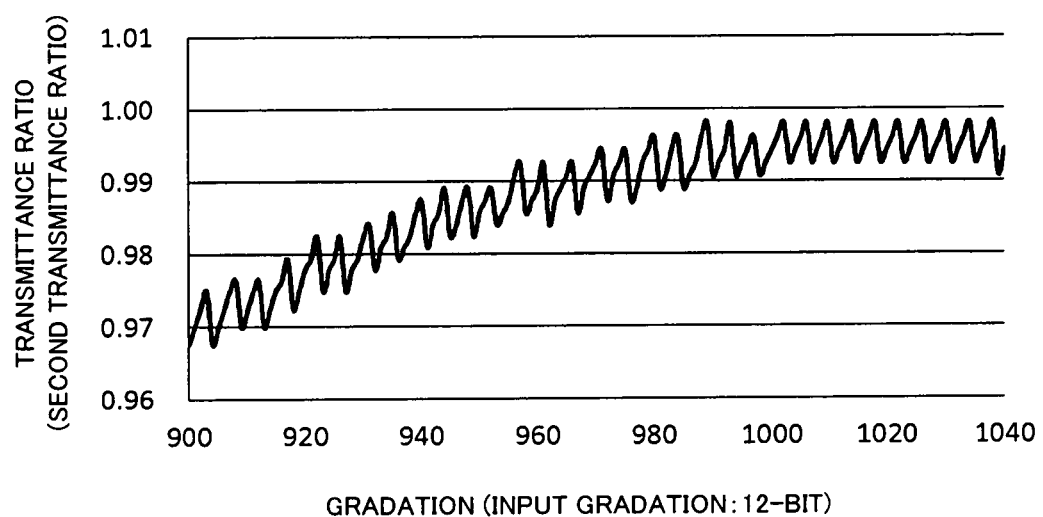
FIG. 18 is a graph corresponding to enlarged portion (G) in FIG. 15.

A difference between combined transmittance obtained by combining the transmittance of display panel 100 with the transmittance of display panel 200 and the target transmittance (see FIG. 7) is calculated (error calculation step). Next, the 10-bit output gradation (second gradation) of display panel 200 is set such that the difference between the combined transmittance and the target transmittance could satisfy the minimum value (second gradation characteristic setting step). Specifically, the first transmittance (see curve (21) in FIG. 15) corresponding to the set first gradation characteristic of display panel 100 (see curve (1) in FIG. 8) is multiplied by a desired correction value, and the correction value is determined so that a difference between a value obtained by the multiplication and the target transmittance could satisfy a minimum value (correction step). This corrected value determined by this process is determined as the transmittance (second transmittance) of display panel 200. Curve (22) in FIG. 15 shows a characteristic of the second transmittance thus determined (second transmittance characteristic) in display panel 200. FIG. 17 is a graph corresponding to enlarged portion (F) in FIG. 15. FIG. 18 is a graph corresponding to enlarged portion (G) in FIG. 15. As illustrated in FIG. 17, in a rising region in a low-gradation region (e.g., a region from 0 gradation to about 900 gradation), the transmittance rises as a whole while increasing and decreasing periodically and repeatedly as an input gradation rises. In other words, the second transmittance increases as a whole while containing a portion (transmittance inversion portion) where the transmittance decreases (is inverted) when the input gradation rises. As illustrated in FIG. 18, in a region after the rising region (e.g., a region of about 900 gradation or more), as the same as the rising region (see FIG. 17), the transmittance changes while increasing and decreasing periodically and repeatedly as the input gradation rises. An amount of change in transmittance inversion portion in the region after the rising region is larger than an amount of change in transmittance inversion portion in the rising region (see FIG. 17). Based on the second transmittance characteristic thus determined (see curve (22) in FIG. 15), the second gradation characteristic of display panel 200 is set (see curve (2) in FIG. 8).

The first gradation characteristic set as described above is associated with, for example, first gradation LUT 312. The second gradation characteristic is associated with, for example, second gradation LUT 323. A setting method for the first gradation characteristic and the second gradation characteristic is not limited to the above method.

Figure 19:
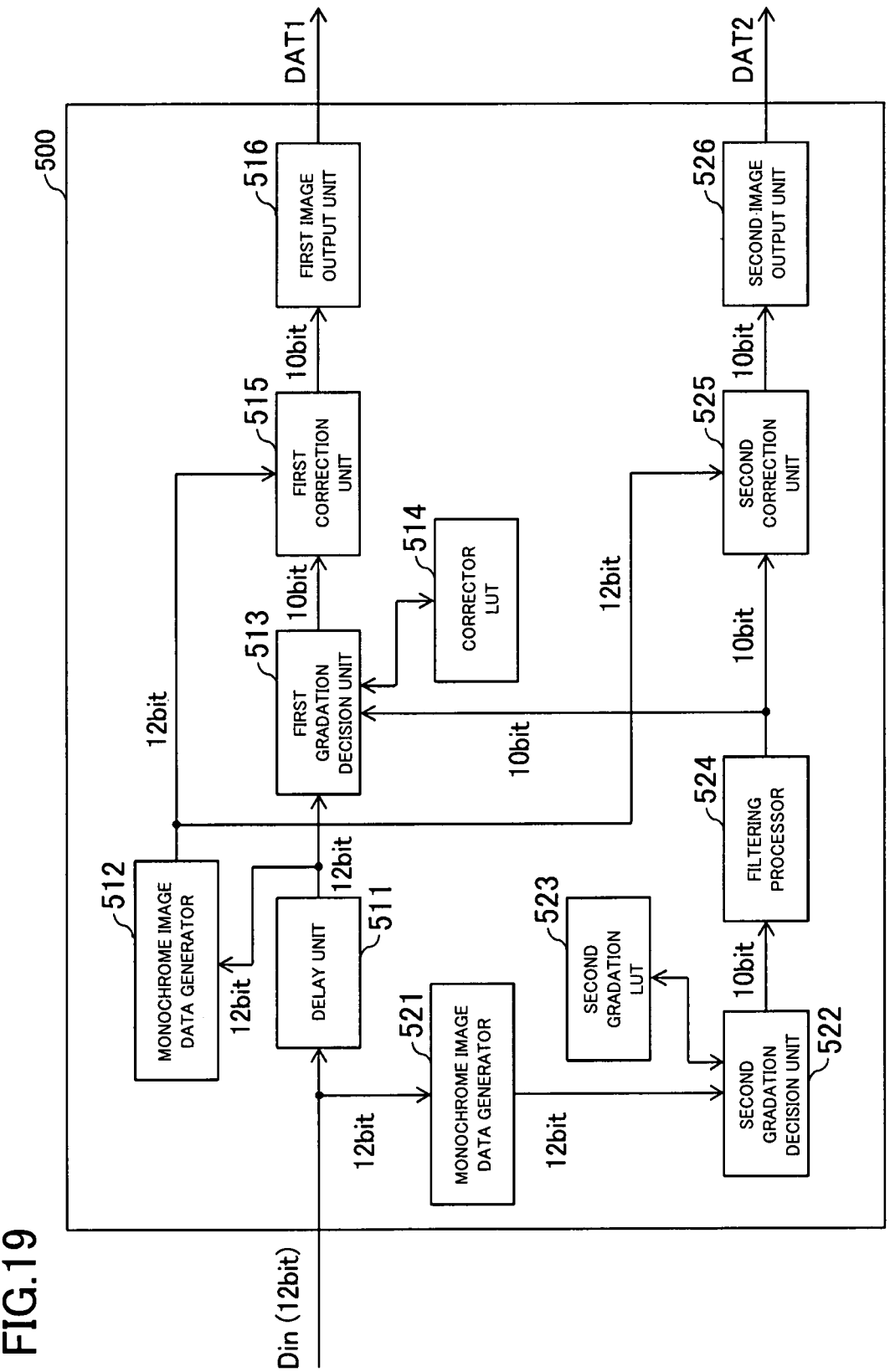
FIG. 19 is a block diagram illustrating a first modification example of the image processor.

A configuration of the image processor according to the present exemplary embodiment is not limited to the configuration illustrated in FIG. 6. FIG. 19 is a block diagram illustrating another configuration (first modification example) of the image processor.

Image processor 500 according to the first modification example includes delay part 511, monochrome image data generation parts 512, 521, first gradation decision unit 513, correction LUT 514, first correction unit 515, first image output part 516, second gradation decision unit 522, second gradation LUT 523, filter processing part 524, second correction unit 525, and second image output part 526.

Image processor 500 receives 12-bit input image data Din transmitted from an external system, and then transfers input image data Din to delay part 511 and monochrome image data generation part 521. Monochrome image data generation part 521 generates monochrome image data and outputs the monochrome image data to second gradation decision unit 522, as in monochrome image data generation part 321 illustrated in FIG. 6.

Second gradation decision unit 522 refers to second gradation LUT 523 to determine a 10-bit output gradation (second gradation) corresponding to 12-bit monochrome image data (input gradation), and outputs 10-bit monochrome image data corresponding to the determined output gradation to filter processing part 524. Associated with second gradation LUT 523 is such a gradation characteristic that an output gradation (10 bits) smoothly increases (for example, regularly increases in a stepwise manner) as an input gradation (12 bits) rises. The second gradation characteristic thus has a characteristic that the output gradation (10 bits) smoothly increases (for example, regularly increases in a stepwise manner) as the input gradation (12 bits) rises.

Filter processing part 524 performs, for example, an expansion filtering process and an average value filtering process. In the expansion filtering process, filter processing part 524 acquires 10-bit monochrome image data from second gradation decision unit 522 and then expands a high luminance region on the acquired monochrome image data. With regard to, for example, each pixel 214 (target pixel) (see FIG. 3), filter processing part 524 sets the maximum value of luminance in a given filter size (e.g., 11 pixels×11 pixels) at the luminance of the relevant pixel (target pixel). The expansion filtering process enables expansion of a high luminance region (e.g., a white region) as a whole. The filter size is not limited to the 11×11-pixel region. The filter shape is not limited to a square shape, but may be a circular shape. In the average value filtering process, filter processing part 524 performs a smoothing process on the monochrome image data subjected to the expansion filtering process, using an average value filter common to all pixels 214 in each frame. With regard to, for example, each pixel 214 (target pixel), filter processing part 524 defines as a filter size a 11×11-pixel region composed of surrounding upper, lower, left, and right 11 pixels, and sets an average value of luminance values in the filter size at the luminance of relevant pixel 214 (target pixel). The filter size is not limited to the 11×11-pixel region. The filter size to be set herein is common to all pixels 214 in each frame. The filter shape is not limited to a square shape, but may be a circular shape. The smoothing process enables a reduction in high-frequency component to achieve smoothening of a change in luminance. Filter processing part 524 outputs the 10-bit monochrome image data subjected to the processes described above to first gradation decision unit 513 and second correction unit 525.

First gradation decision unit 513 corrects the gradation of 12-bit input image data Din acquired from delay part 511, based on correction LUT 514 and the gradation (second gradation) of the 10-bit monochrome image data acquired from filter processing part 524, and determines a gradation (first gradation) corresponding to 10-bit color image data. For example, first gradation decision unit 513 acquires the 10-bit monochrome image data (second gradation), converts it to 12-bit monochrome image data, and determines the first gradation corresponding to the 12-bit color image data from the following equation.

First gradation (12 bits)=4095×input gradation (12 bits)/second gradation (12 bits)

Next, first gradation decision unit 513 converts the 12-bit color image data of the determined first gradation to 10-bit color image data, and outputs the 10-bit color image data to first correction unit 515. The first gradation corresponding to the 10-bit color image data has a characteristic that an output gradation (10 bits) increases by containing an inverted portion (i.e., gradation inversion portion) as an input gradation (12 bits) rises (first gradation characteristic).

Monochrome image data generation part 512 performs, on 12-bit input image data Din acquired from delay part 511, processes similar to those performed by monochrome image data generation part 521, and outputs resultant input image data Din to first correction unit 515.

First correction unit 515 corrects the first gradation characteristic, based on the 10-bit color image data (first gradation) having the first gradation characteristic and acquired from first gradation decision unit 513 and the 12-bit monochrome image data acquired from monochrome image data generation part 512. For example, first correction unit 515 corrects the color image data (first gradation) having a gradation characteristic containing the gradation inversion portion, to obtain color image data (first correction gradation) having such a gradation characteristic that an output gradation (10 bits) smoothly increases (for example, regularly increases in a stepwise manner) as an input gradation (12 bits) rises as illustrated in FIGS. 8 to 10. First correction unit 515 outputs 10-bit monochrome image data corresponding to the first correction gradation thus corrected, to first image output part 516.

Second correction unit 525 corrects the second gradation characteristic, based on the 10-bit monochrome image data (second gradation) having the second gradation characteristic and acquired from filter processing part 524 and the 12-bit monochrome image data acquired from monochrome image data generation part 512. For example, second correction unit 525 corrects monochrome image data (second gradation) having such a gradation characteristic that an output gradation (10 bits) smoothly increases (for example, regularly increases in a stepwise manner) as an input gradation (12 bits) rises, to obtain monochrome image data (second correction gradation) having a gradation characteristic containing a gradation inversion portion, as illustrated in FIGS. 8, 9, 11, and 12. Second correction unit 525 outputs 10-bit monochrome image data corresponding to the second correction gradation thus corrected, to second image output part 526.

First image output part 516 outputs the 10-bit color image data (first correction gradation) as first image data DAT1 to first timing controller 140. Second image output part 526 outputs the 10-bit monochrome image data (second correction gradation) as second image data DAT2 to second timing controller 240. The first gradation characteristic corresponding to the first correction gradation is identical to the gradation characteristic shown by curve (1) in FIG. 8. The second gradation characteristic corresponding to the second correction gradation is identical to the gradation characteristic shown by curve (2) in FIG. 8.

Liquid crystal display device 10 according to the first modification example produces advantageous effects similar to the advantageous effects obtained by the configuration illustrated in FIG. 6 and, further, prevents a reduction in visibility (parallax problem) that may occur when the display screen is seen from an oblique direction.

A liquid crystal display device of the present invention is not limited to the above configuration. For example, the gradation inversion portion of the second gradation characteristic (see FIGS. 11 and 12) may be contained in the first gradation characteristic or may be contained in such a manner that the first gradation characteristic and the second gradation characteristic share the gradation inversion portion.

Input image data Din data may be 10-bit data. Display panel 100 and display panel 200 may display an image based on 8-bit image data. Further, display panel 100 may be disposed at a position farther from the observer (i.e., the rear side). Display panel 200 may be disposed at a position closer to the observer (i.e., the front side). Further, display panel 100 and display panel 200 each may be configured to display a monochrome image.

While there have been described what are at present considered to be certain embodiments of the application, it will be understood that various modifications may be made thereto, and it is intended that the appended claims cover all such modifications as fall within the true spirit and scope of the invention.

What is claimed is:

1. A liquid crystal display device in which a plurality of display panels are superimposed on each other, an image being displayed on each of the plurality of display panels, the liquid crystal display device comprising:
   a first display panel from the plurality of liquid crystal display panels that displays a first image based on input image data of m bits, the first display panel being driven by n bits, where n <m;
   a second display panel from the plurality of liquid crystal display that displays a second image based on the input image data of m bits, the second display panel being driven by the n bits;
   a first gradation decision unit that decides an output gradation value of n bits for the first display panel based on a first gradation characteristic for the first display panel, the output gradation value of n bits for the first display panel corresponding to an input gradation value of the input image data of m bits; and
   a second gradation decision unit that decides an output gradation value of n bits for the second display panel based on a second gradation characteristic for the second display panel, the output gradation value of n bits for the second display panel corresponding to the input gradation value of the input image data of m bits,
   wherein at least one of the first gradation characteristic and the second gradation characteristic includes a gradation inverting portion, which is a portion where the output gradation value decreases when the input gradation value rises.

2. The liquid crystal display device according to claim 1, wherein a decreasing amount of the output gradation value in the gradation inverting portion of a first gradation region is larger than a decreasing amount of the output gradation value in the gradation inverting portion of a second gradation region, the input gradation value in the second gradation region being lower than the input gradation value in the first gradation region.

3. The liquid crystal display device according to claim 1, wherein a decreasing ratio within a predetermined range included in the first gradation region is larger than a decreasing ratio within the predetermined range included in the second gradation region, gradation in the second gradation region being lower than gradation in the first gradation region.

4. The liquid crystal display device according to claim 1, wherein the second gradation characteristic includes the gradation inverting portion, and the output gradation value of the second gradation characteristic increases as a whole while repeating an increase and a decrease, when the input gradation value of the second gradation characteristic rises.

5. The liquid crystal display device according to claim 1,
   wherein the first display panel displays the first image based on a first gradation value that is the output gradation value decided by the first gradation decision unit, and
   the second display panel displays the second image based on a second gradation value that is the output gradation value decided by the second gradation decision unit.

6. A liquid crystal display device in which a plurality of display panels are superimposed on each other, image being displayed on each of the plurality of display panels, the liquid crystal display device comprising:
   a first display panel from the plurality of display panels, the first display panel displaying a first image based on input image data of m bits, the first display panel being driven by n bits, where n<m;
   a second display panel from the plurality of display panels, the second display panel displaying a second image based on the input image data of m bits, the second display panel being driven by the n bits; and
   an image processor that decides a first output gradation value of n bits for the first display panel and a second output gradation value of n bits for the second display panel based on the input image data of m bits,
   wherein the image processor includes: a first gradation decision unit; a second gradation decision unit; a first correction unit; and a second correction unit,
   the second gradation decision unit decides a second gradation value of n bits based on the input image data of m bits,
   the first gradation decision unit decides a first gradation value of n bits based on the input image data of m bits and the second gradation value, the first gradation value having a gradation characteristic including a gradation inverting portion that is a portion where an output gradation value decreases when an input gradation value rises,
   the first correction unit corrects the first gradation value to first correction gradation value of n bits based on the input image data of m bits and the first gradation value,
   the second correction unit corrects the second gradation value to second correction gradation value of n bits based on the input image data of m bits and the second gradation value,
   the second correction gradation value of n bits having the gradation characteristic including the gradation inverting portion, and
   the image processor decides the first correction gradation value as the first output gradation value, and decides the second correction gradation value as the second output gradation value.

7. The liquid crystal display device according to claim 6, wherein a decreasing amount of the second output gradation value in the gradation inverting portion in a first gradation region is smaller than a decreasing amount of the second output gradation value in the gradation inverting portion in the second gradation region, the gradation value in the second gradation region is lower than the gradation value in the first gradation region.

8. A method for displaying an image of a liquid crystal display device in which a first display panel and a second display panel are superimposed on each other, the first display panel driven by n bits displaying a first image based on input image data of m bits, where n<m, the second display panel driven by the n bits displaying a second image based on the input image data of m bits, the method comprising:
   measuring transmittance for each gradation value corresponding to the n bits in each of the first display panel and the second display panel;
   setting a first gradation characteristic, in which an output gradation value regularly increases in a stepwise manner as an input gradation value of the input image data rises, based on target transmittance of the first display panel; and
   deciding a correction value such that a difference between a first value and the target transmittance in the liquid crystal display device is minimized, the first value being obtained by multiplying first transmittance corresponding to the first gradation characteristic set in the second step by the correction value, and of deciding a second gradation characteristic of the second display panel based on the correction value; and deciding the correction value as a second transmittance of the second display panel, a characteristic of the second transmittance and a second gradation characteristic corresponding to the characteristic of the second transmittance include a gradation inverting portion that is a portion where the output gradation value decreases when the input gradation value rises.

9. The liquid crystal display device according to claim 1, wherein the output gradation value is a first output gradation value (m1) when the input gradation value is a first input gradation value (n1), and the output gradation value is a second gradation value (m2) that is less than the first output gradation value (m1>m2) when the input gradation value is a second input gradation value (n2) that is greater than the first input gradation value (n1<n2).

10. The liquid crystal display device according to claim 9, wherein the output gradation value is a third output gradation value (m3) that is greater than each of the first and the second output gradation values (m2<m1<m3) when the input gradation value is third input gradation value (n3) that is greater than each of the first and the second input gradation values (n1<n2<n3).

* * * * *